United States Patent
Travis et al.

(10) Patent No.: US 6,269,367 B1
(45) Date of Patent: Jul. 31, 2001

(54) SYSTEM AND METHOD FOR AUTOMATED IDENTIFICATION, REMEDIATION, AND VERIFICATION OF COMPUTER PROGRAM CODE FRAGMENTS WITH VARIABLE CONFIDENCE FACTORS

(75) Inventors: Sheldon H. Travis, Coppell; Jeffrey D. Clignett, Dallas; William A. Fahle, Jr., Plano; Lance P. Johnston, Coppell; Theodore C Waldron, III, Trophy Club, all of TX (US)

(73) Assignee: MigraTEC, Inc., Dallas, TX (US)

( * ) Notice: Subject to any disclaimer, the term of this patent is extended or adjusted under 35 U.S.C. 154(b) by 0 days.

(21) Appl. No.: 09/106,465

(22) Filed: Jun. 30, 1998

(51) Int. Cl.[7] .................................................. G06F 17/30
(52) U.S. Cl. ........................ 707/6; 707/2; 707/3; 707/4; 707/202
(58) Field of Search .................................. 707/6, 2, 3, 4, 707/202; 717/4, 1

(56) References Cited

U.S. PATENT DOCUMENTS

| | | | |
|---|---|---|---|
| 5,842,204 | * 11/1998 | Andrews et al. | 707/31 |
| 5,860,008 | * 1/1999 | Bradley | 395/704 |
| 5,862,380 | * 1/1999 | Brady | 395/704 |
| 5,881,290 | * 3/1999 | Ansari et al. | 395/705 |
| 6,006,031 | * 12/1999 | Andrews et al. | 395/701 |
| 6,023,582 | * 2/2000 | Rogers et al. | 395/708 |

* cited by examiner

Primary Examiner—John Breene
Assistant Examiner—Cheryl Lewis
(74) Attorney, Agent, or Firm—Hugh R. Kress; Winstead Sechrest & Minick P.C.

(57) ABSTRACT

An improved system and method of automating the identification, remediation and verification of computer program code fragments which have no specific search criteria using an iterative dynamic self propagating global symbol table. Computer code is input and then decomposed into predefined table entries. This is used to verify that all of the source code is present and to provide forward and backward linking to related code fragments containing various levels of dynamically modified confidence factors. Global computer program changes can then be made regardless of the initial state of the code fragment or number of redefinition's in a swap-by-propagation fashion. Remediations are logged to provide verification data and to insure complete testing.

18 Claims, 14 Drawing Sheets

| SYMBOL | ATTRIBUTE | CONFIDENCE | LOCATION | DISTANCE |
|--------|-----------|------------|----------------|----------|
| YEAR   | VARIABLE  | 90         | C:\SRC\FIL1 22 | 0        |
| 1900   | STRUCTURE | 60         | C:\SRC\FIL2 46 | 0        |
| •••    | •••       | •••        | •••            | •••      |
| n      | n         | n          | n              | n        |

*FIGURE 5*

| EXPR | PARENT | NODE | FILE/LOCATION | ORDER |
|------|--------|------|---------------|-------|
| 1 | X | = | C:\SRC\FIL22 9 | 1 |
| 2 | = | X | C:\SRC\FIL22 8 | 2 |
| 3 | = | Y | C:\SRC\FIL22 10 | 3 |
| • | • | • | • | • |
| • | • | • | • | • |
| • | • | • | • | • |
| n | n | n | n | n |

X=Y

SIBLING ORDER →

*FIGURE 5A*

| STRUCTURE 1 | STRUCTURE 2 | STRUCTURE 3 | • | • | • | STRUCTURE n |
|---|---|---|---|---|---|---|
| CONSTANT 1 | CONSTANT 2 | CONSTANT 3 | • | • | • | CONSTANT n |
| TYPEDEF 1 | TYPEDEF 2 | TYPEDEF 3 | • | • | • | TYPEDEF n |
| VARIABLE 1 | VARIABLE 2 | VARIABLE 3 | • | • | • | VARIABLE n |
| FUNCTION 1 | FUNCTION 2 | FUNCTION 3 | • | • | • | FUNCTION n |
| PARAMETER 1 | PARAMETER 2 | PARAMETER 3 | • | • | • | PARAMETER n |
| ALL OTHERS 1 | ALL OTHERS 2 | ALL OTHERS 3 | • | • | • | ALL OTHERS n |

*FIGURE 8*

SYSTEM AND METHOD FOR AUTOMATED IDENTIFICATION, REMEDIATION, AND VERIFICATION OF COMPUTER PROGRAM CODE FRAGMENTS WITH VARIABLE CONFIDENCE FACTORS

TECHNICAL FIELD OF THE INVENTION

The present invention relates to electronic data processing systems and more particularly to the discovery of computer code sequences that are candidates of interest without specific search criteria. Still more particularly, the present invention relates to apparatus and process for the identification of said computer code sequences and subsequent modification and verification.

BACKGROUND AND RELATED ART

As the year 2000 approaches, there has been a significant increase in concern over computer programs being "Year 2000 Compliant". Many computer programs have been written using only the last two digits of the year in various ways such that these computer code fragments will fail or produce incorrect results when entering "00" or "0". Such would be the case when calculating a person's age using the two digit birth year and subtracting from the current year, 0−75=−75. However, there are a near infinite number of ways that a two digit date could be used in a computer program such that incorrect results would be produced by entering only the last digits of the year at the turn of the century. The computer industry has reacted to this problem by allocating significant resources in terms of personnel and finances due to the extreme diversity of the problem. The problems encountered in the computing environment are very diverse due to many factors such as: the number of operating systems, computer languages, and types of applications in use. However, all of the factors associated with correcting the date related problem at the turn of the century could be divided into four categories: inventory, analysis, remediation, and verification.

The inventory is the list of all of the source code files of a particular system or sub-system that are required to rebuild the executing program(s). In some cases the original source code is missing or incomplete. The process of obtaining a complete set of files is subject to human error and not required by existing source code remediation solutions to begin the analysis.

The goal of the analysis is to detect only code fragments that are of interest because a date is manipulated within the computer program. This is particularly difficult since there is no way to be certain that all of the date manipulations can be located using only date related character strings. Attempts to automate the process of finding code fragments involve using a "seed list" of character sequences relating to date fields and sequentially scanning source code files. Usually, additional character sequences are discovered in the process of scanning all of the source code files. These newly discovered character sequences are then added to the seed list and re-applied against all of the source code in an iterative fashion of unpredictable duration. One of the major problems with this approach is that computer programs are typically written to assign a code fragment of interest to another variable, location or function. This could result in a failure to detect the redefined code fragments. Another problem is that this method does not verify that all of the source files are present before scanning the source files using the seed list. Hence, it is often late in the project when it is discovered that source code is missing or out of date.

Remediation is defined as the modification of a code fragment into a desirable result that corrects the identified problem. Once identified, a code fragment is subject to multiple forms of correction. This may be accomplished simply by presenting the code fragment visually or in report form and allowing manual correction one after another. Another method is to apply a set of rules particular to a specific code fragment automatically or provide one or more alternatives for user selection. However, none of the existing remediation methodologies have the capability to locate the optimal remediation points within the source code fragments. Hence, a variable named "date" may be in the comments, part of an assignment, or any one of dozens of computer constructs and all could be traversed before locating its definition which is most likely the best location to correct the problem. Worse, correcting a problem at the wrong location within the processing could compound the work effort required to actually remediate or correct the identified code fragment.

Verification of the remediated code fragment changes, which have been either manually or automatically generated, requires that said code fragments be executed in direct testing. Verification is generally overlooked in existing remediation methodologies. Currently, this requires comprehensive testing of all of the program functions since it unknown at the user level if the testing actually traversed all of the newly modified code fragments. However, in practice, the data entry fields associated with dates is all that is tested. Additionally, a modified code fragment could be traversed when no date was actually entered as in the case of program initialization. Computer programmers know this and generally do some level of additional testing to expose these hidden potential problems. Now the problem becomes to determine when to stop testing since there are no metrics regarding the percentage of completion other than the total of all possible tests that could be run. It is also possible that a code fragment modification could have been made without having a specific test case to traverse the newly modified code fragment. Inadequate or incomplete testing and verification has plagued a number of the year 2000 conversions after the systems were actually installed.

The technical challenge is to find an automated method to identify computer code fragments having only partially defined search criteria and the subsequent remediation and verification of said computer code fragments while minimizing the introduction of human errors and reducing the total effort required throughout the entire process.

SUMMARY OF THE INVENTION

The present invention is directed to a process which: identifies computer code fragments within a computer program without having specific search criteria; corrects said computer code fragments; and verifies the corrections applied to said computer code fragments. The present invention is also directed to a process that reduces or eliminates human intervention by providing integrity checking within the process. The invention is directed to a process that comprises the following steps: reading into memory computer source code file or files; generating a symbol table containing related information; optionally verifying that all symbols are present for a given system or sub-system; identifying symbols of interest; repeating the following steps for a plurality of symbols;

checking for forward or backward related symbols and providing for automatic transformation of said symbols;

optionally manually or automatically modifying the code fragments so as to correct the identified problem;

assigning and dynamically modifying a confidence factor to each symbol;

inserting logging statements proximate to the manually or automatically inserted code fragments;

building and executing the modified program; logging the newly modified code fragments; verifying that all modified code fragments have been traversed during testing and verification.

The present invention has several advantages over the prior art of correcting code fragments and data relating to the year 2000 compliance. One advantage is due to the global symbol table generation. This provides an integrity check to insure that all files are present before the analysis begins. This eliminates multiple partial searches of the seed list against an incomplete source code base. The global symbol table also provides the advantage of forward and backward linking to other computer code fragments so that redefinition of positively identified code fragments can not escape detection. Once a symbol is recognized as a redefinition, an automatic transformation can be done as opposed to a manual code fragment modification as in the case of remediation. This eliminates the possibility of human error when a redefinition of a positively identified code fragment occurs.

Another advantage of the present invention is the assignment of a dynamic confidence factor to each of the symbols. This aids the person evaluating a specific symbol during the normal course of the analysis. Symbols that are determined not to be of interest will have their confidence level set to zero, which would effectively eliminate them from the search criteria. The value of the confidence factor is automatically adjusted based on the relationships within the symbol table construction. Symbols with varying levels of confidence found to match the proper criteria can be promoted to a confidence level of 100. This would allow both automatic and manual modification of the search criteria during the entire analysis. Thus, more efficient and fewer searches are needed to identify all code fragments of interest due to the automatic recognition of redefined code fragments and the dynamically modified confidence factor associated with the symbols.

Yet another advantage of the present invention is the automatic location of optimal remediation points due to the structured ordering and execution of the remediation priority table. We can know for certain that all symbols that are elements of structures must be resolved before resolving the constants and other elements of the language as shown in FIG. 4. using the preferred embodiments of the present invention on the C language. We also know that randomly correcting the various symbols within a computer program can cause conflicts that are avoided by performing the remediation in the proper order. Therefore, not only does the present invention streamline the actual remediation process; it greatly reduces the total number of remediations needed to resolve all of the symbols.

Still another advantage of the present invention is that whenever a code fragment is modified, a logging or tracking event is placed proximate to the modification with an optional note field containing a description of how to test this particular remediation. This provides various metrics as well as reducing the final testing cycle. The final testing cycle is reduced because when all modified code fragment paths have been traversed, all logging or event statements will have been reported. This insures complete testing of the code fragment modifications without necessarily testing all of the programs functions. This also has the advantage of providing the percentage of completion based on the number of logging or events actually reported as compared to the total on record. If any logging or tracking events are remaining at the completion of testing, this method has the added advantage of describing how to test the remaining remediations if such a description was entered at the time of insertion.

It is therefore an object of the present invention to provide a method and apparatus that determines if all the source code is present by cross referencing the generated symbol table or allowing partial processing prior to commencing the initial analysis.

It is another object of the invention to provide a method and apparatus to track forward and backward references in an automated fashion so that the confidence factor of each symbol can be automatically or manually modified and then automatically propagated to the symbols that are redefined.

It is yet another object of the present invention to provide a method and apparatus to reduce the effort required to correct identified code fragments by determining the optimal remediation points.

It is yet another object of the present invention to provide a method and apparatus to eliminate human error in the case of redefinition by providing an automated method for remediation.

It is still another object of the invention to provide a method and apparatus to insert logging or tracking event statements into code fragments manually or automatically modified to verify execution of the modified code fragments and reduce the testing cycle time.

The foregoing and other objects, features and advantages of the invention will be apparent from the following more particular description of a preferred embodiment of the invention. This is illustrated in the accompanying drawings wherein like reference numbers represent like parts of the invention.

BRIEF DESCRIPTION OF THE DRAWINGS

FIG. 5 is an exemplary table of the properties associated with a sample of a symbol table entry.

FIG. 5a is an exemplary table of the properties associated with a parse table entry.

FIG. 6 shows a method for constructing the symbol table. FIG. 7 shows a method for propagation of the symbols. FIG. 7a shows a method for calculating the confidence and distance.

FIG. 8 is an exemplary table of the remediation order.

DETAILED DESCRIPTION

Figure 1:
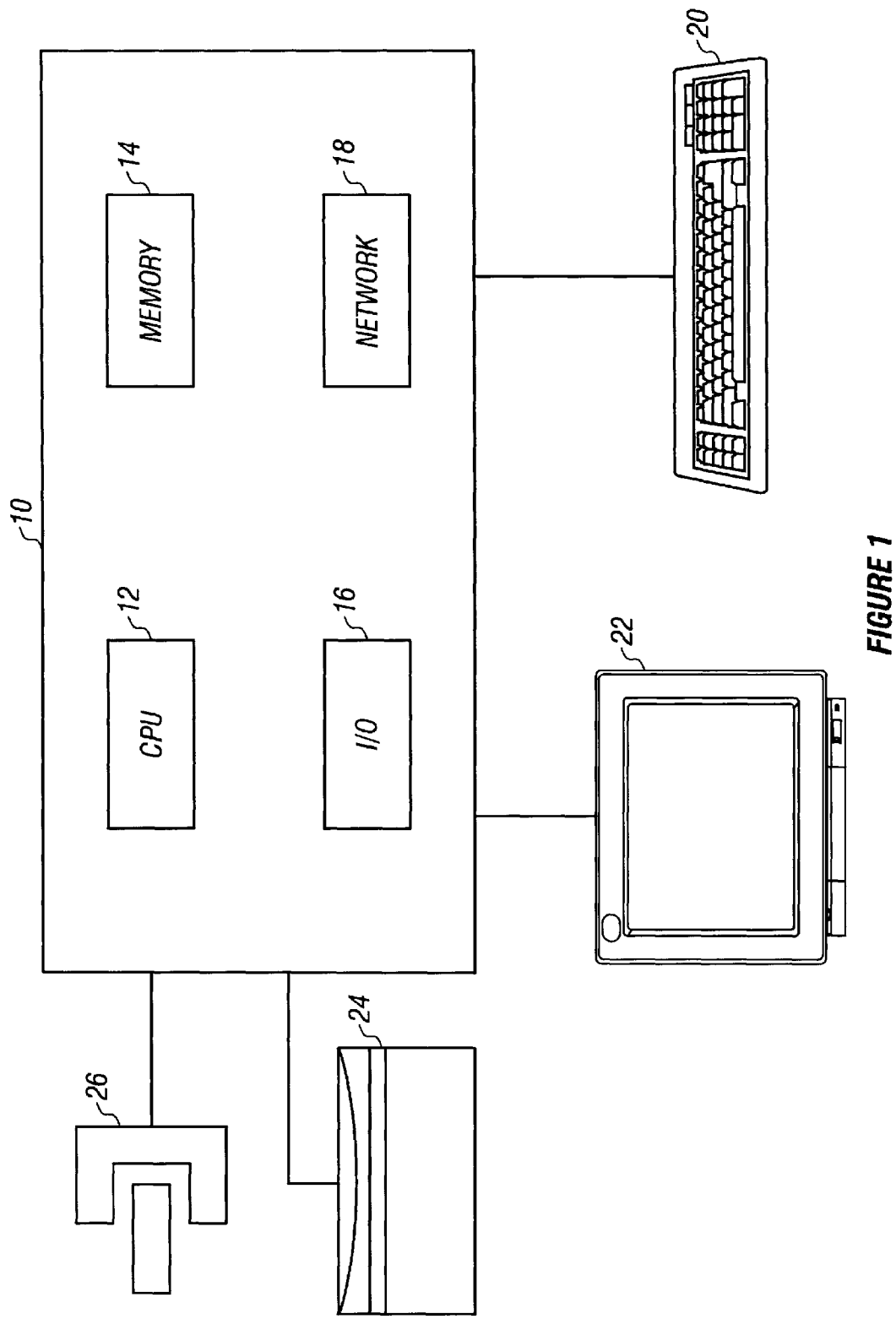
FIG. 1 is a block diagram of selected internal components of a personal computer, upon which the present invention can be practiced.

In FIG. 1, there is shown a block diagram of the internal components of a personal computer 10 upon which the present invention can be practiced. The computer 10 has a central processing unit (CPU) 12. In the preferred embodiment, the CPU is an Intel Pentium microprocessor, although the present invention can be used with other microprocessors as well. The CPU 12 is connected to the Memory 14. The memory 14 is typically Dynamic Random Access Memory (DRAM) or Synchronous Dynamic Random Access Memory (SDRAM) configured in Single Inline Memory Modules (SIMM). The CPU 12 is also connected to the I/O Controller 16 that is in turn connected to the Keyboard 20 and Display 22. Network 18 interface card is a common addition to many personal computers and is also connected to the CPU 12. Mass Storage Device 24 and removable media device 26 are similarly connected to the CPU 12. The present invention can be implemented on other types of computers besides the computer 10 shown and described in FIG. 1.

Figure 2A:
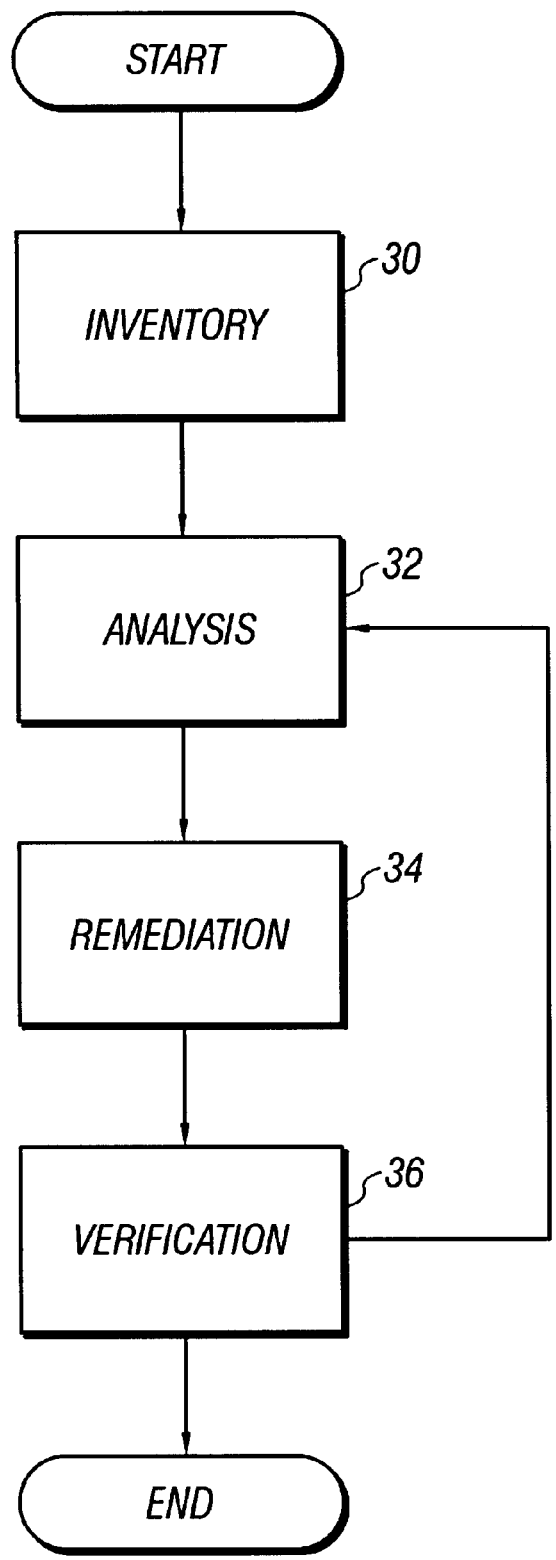
FIG. 2a is a data processing diagram depicting the inventory and analysis interactions.
Figure 2B:
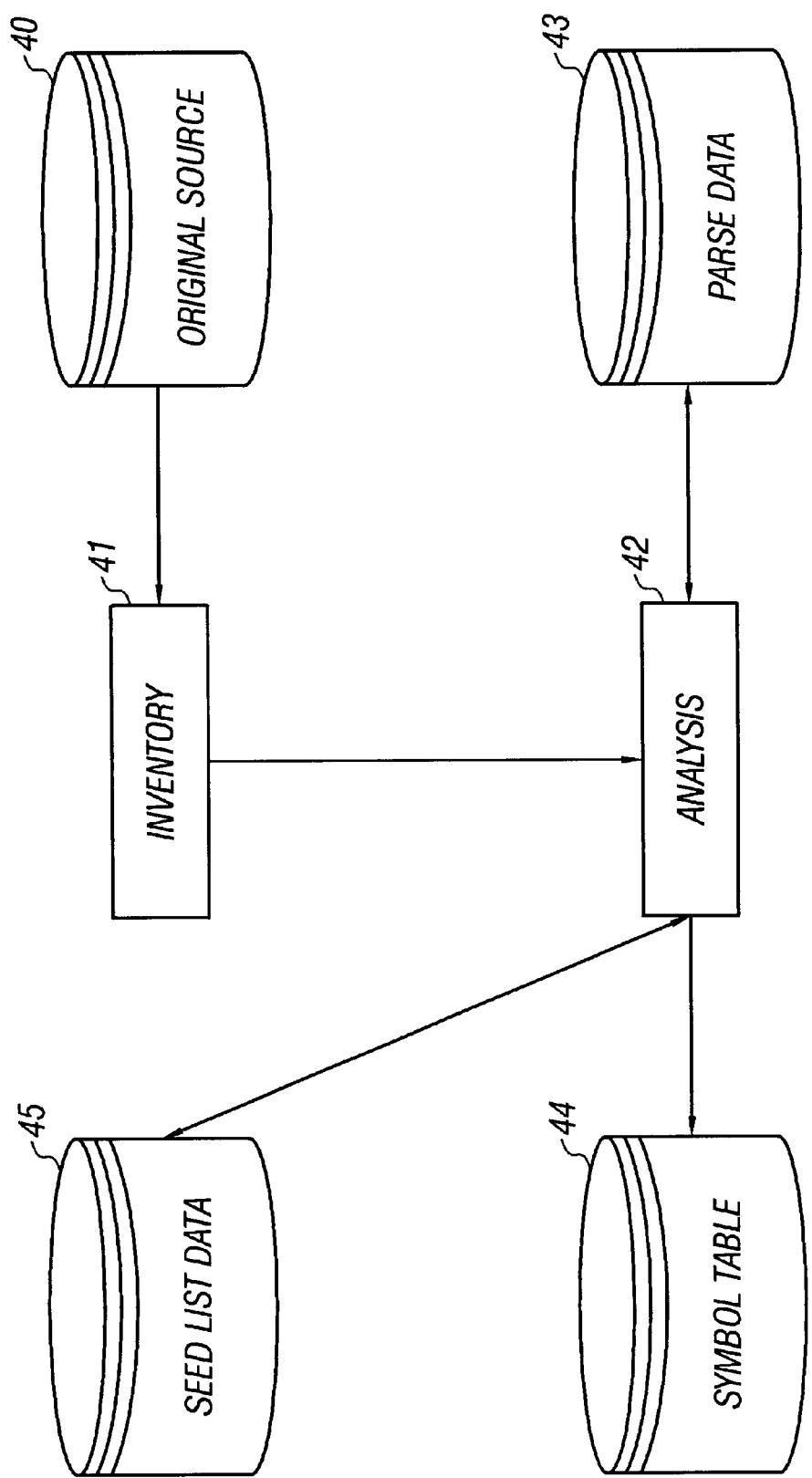
FIG. 2b is a data processing diagram depicting the remediation and verification interactions.
Figure 2C:
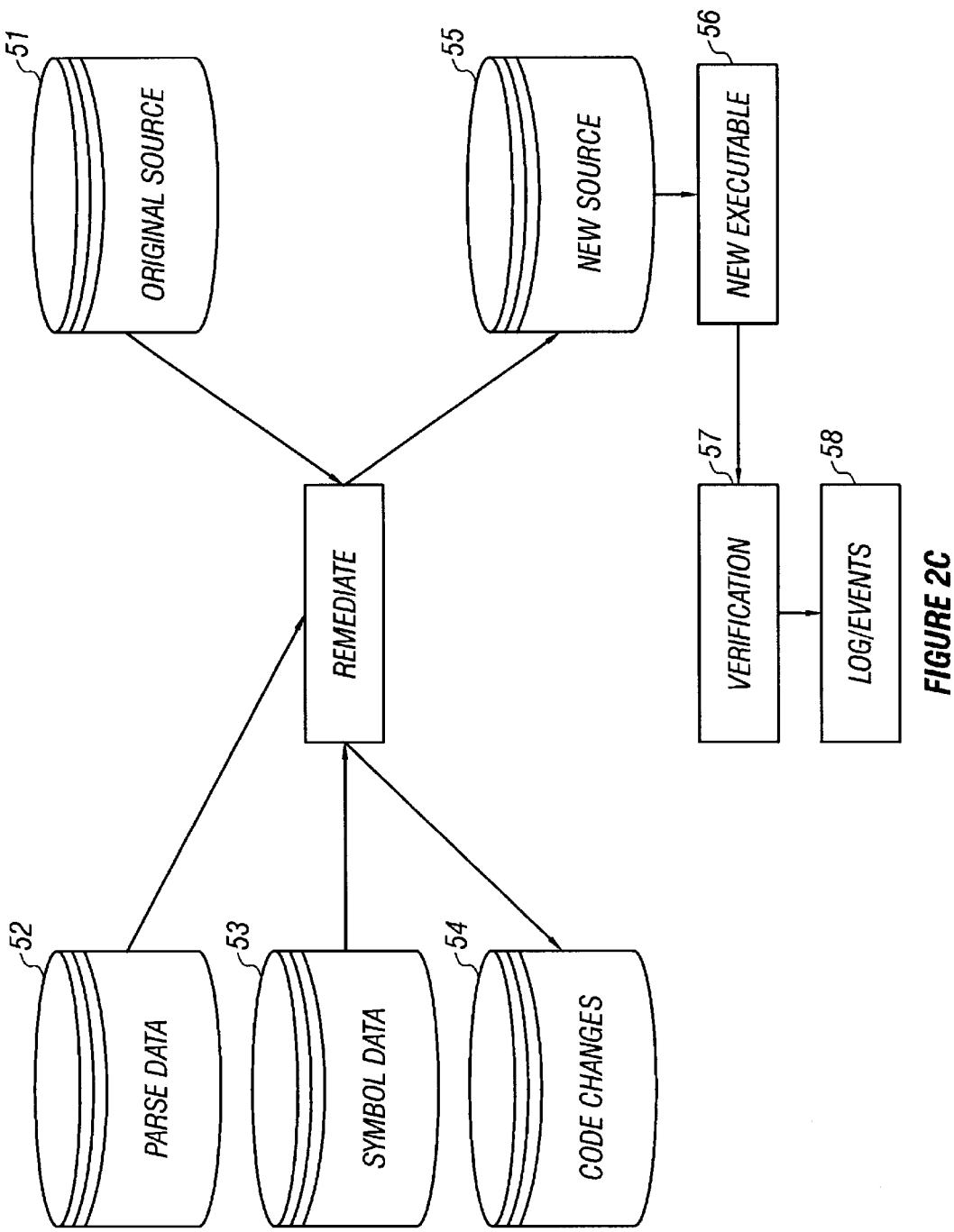
FIG. 2 is a block diagram depicting the relationship between the inventory, analysis, remediation, and verification stages of the preferred embodiment of the present invention.

Referring now to FIG. 2 which is a data flow diagram of a high level overview of the major steps involved to identify, correct, test, and verify code fragments which have no discernible search criteria. FIG. 2 illustrates the structure and relationships between the various components. A computer program is composed of one or more source code files and a complete set of computer program source files makes up a full inventory 30. Such an inventory 30 should be all of the source code files required to regenerate a working computer program, system or sub-system. The preferred embodiment of the present invention is implemented on the Microsoft Windows NT operating system upon which source code files are written specifically to execute in that environment. Other operating systems and source code combinations can be employed. The analysis 32 consist of locating computer code fragments one after another relating to a date in which only two characters are processed in the preferred embodiment of the present invention. Other search criteria which are not clearly and explicitly defined can be employed. Once code fragments of interest have been located, a correction or remediation 34 to the said code fragment which modifies the source code fragment and corrects the problem is performed. Ideally, the analysis 32 finds all of the source code fragments before beginning the remediation 34. However, it is possible that additional symbols could be located proximate to symbols under examination and subsequently be added to the analysis during the remediation 34 in an iterative fashion. A return from remediation 34 to analysis 32 would also occur if any new symbol was discovered and it was deemed beneficial to restart the processes using the original symbol list and including the newly discovered symbol. Verification 36 occurs when all symbols have been found and all remediations have completed. Verification 36 is composed of running the final executable that has been regenerated or built using the modified source code of the remediation 34. The process of verification 36, remediation 34 and analysis 32 are iterative during the normal course of the entire process with the exception that verification 36 usually does not occur until all known symbols are processed in analysis 32 and all known remediations 34 have been completed. Verification 36 is completed when all modified code paths have been traversed and all date related entry fields have been tested.

Referring now to FIG. 2a which is a data flow diagram of a high level description of the interaction between the inventory and analysis components. Original source code 40 serves as input into the inventory 41. Ideally, this contains all of the source code files for a particular system or sub-system. However, it may contain as little as a single source file of a multiple source program or even a source code fragment of a single source code file. Using the inventory 41, the analysis 42 produces the parse data 43. The seed list data 45 is used as input to build the symbol table 44. The analysis 42 processes the data to set the initial confidence for each symbol. Analysis 42 sequentially reads the original source 40 and builds the parse database 43 for each symbol. Starting with the first symbol of the parse database 43, a search is made in the seed list 45. When a match is found, parameters from the seed list are incorporated into the symbol's 44 definition. This process repeats until all of the symbols 44 have been processed for each symbol in the inventory 41.

Referring now to FIG. 2b which is a data flow diagram of a high level description of the interaction between the remediation and verification components. Remediation 50 commences when the user has entered all of the source code file or the particular file or code fragment to be processed and the inventory 30 and analysis 32 of FIG. 2a have completed successfully. Remediation 50 reads parse data 52 and symbols 53 and then links to the original source code 51 to induce a manual source code change or an automatic source code change as in the case of transformation. The actual source code change is spooled to the code changes database 54. Once all of the source code changes have completed, the remediation 50 reads in the code changes data base 54 and outputs the new source 55 which is then used to generate or build the new executable 56. The newly generated executable 56 is run which begins verification 57. Running the executable produces the logging or tracking events 58. When all recorded logging or tracking events have been reported and all date-related fields have been entered with satisfactory results, the entire process is completed. If all of the logging or tracking events are not reported, then additional verification 57 is needed. If any date-related fields produce incorrect results then a return to the analysis 42 of FIG. 2a is indicated and additional symbols are required to be processed as needed.

Referring to FIGS. 3, 6, 7, and 7a which contain flow charts illustrating the method of the analysis of the present invention will be described. In the flow charts, the following graphical conventions are used: a diamond is used to illustrate a decision and a rectangle is used to illustrate a process or function. These conventions are well understood by programmers who are skilled in the art of data processing systems, and the flow charts are sufficient to enable a programmer skilled in the art to write code in any suitable programming language such as C for a computer with an Intel or compatible CPU using an operating system such as Windows NT. Other computer program languages, operating systems and CPU's can be used.

Figure 3:
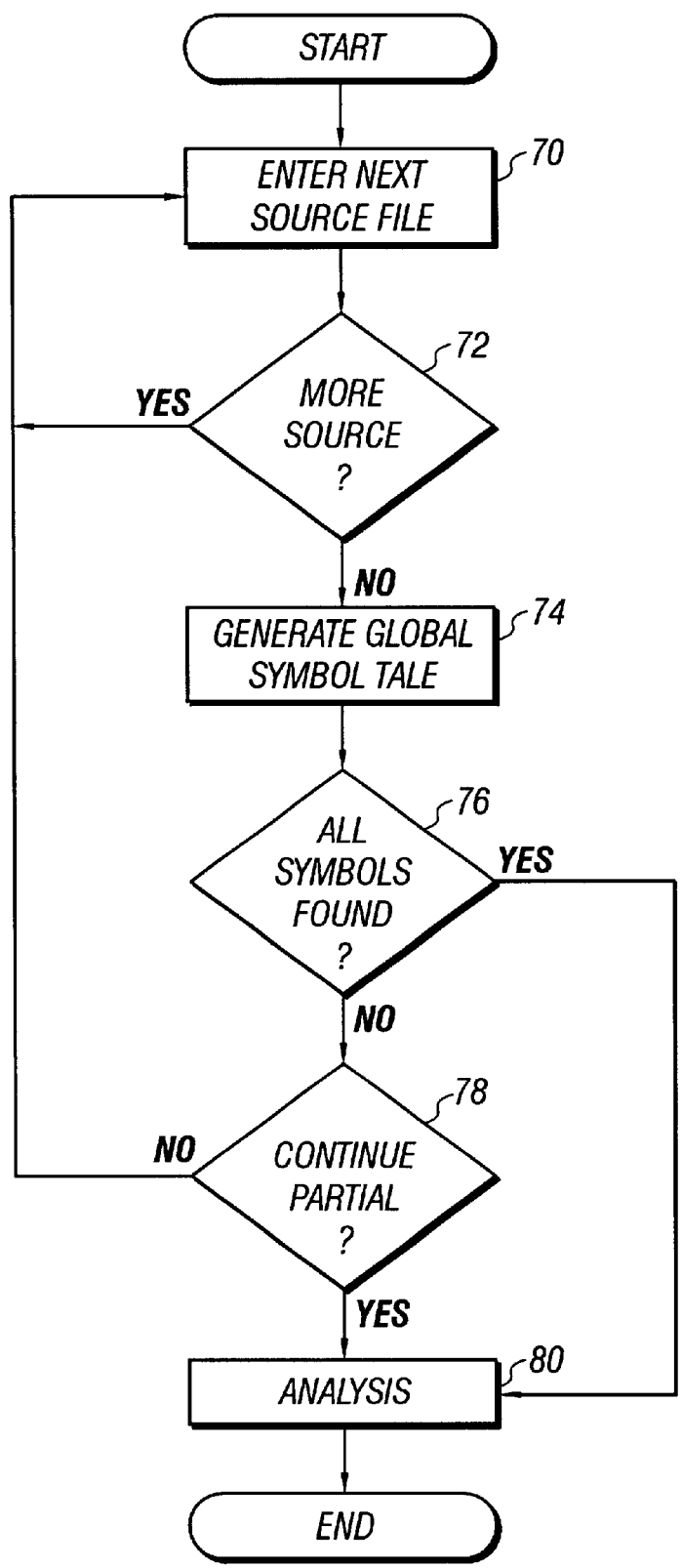
FIG. 3 is a flow chart of the method for determining if all of the source code files are present.

Referring now to FIG. 3, the flow chart illustrates how the generated global symbol table can verify that a complete set of source files has been entered. Source code files are entered 70 with a query 72 for additional source code files and returning to entering the next source code file 70 iteratively until all source code files have been entered. A negative response to query 72 indicates that all source files have been entered and a global symbol table 74 is generated. The generated symbol table contains all of the referenced symbols including items such as structures, variables, pointers, and the like. The query at step 76 is made internally. If there is one or more missing forward or backward references or declarations then it is likely that all of the source code has not been entered. An exception is posted at step 78 and a query to continue using only a partial source code base is presented This provides an integrity check indicating that not all source code files have been entered or that the source code is out of date. In most cases, it is desirable to return to step 70 and complete the process of entering the source code files based on the symbols reported with missing declarations or identifiers. However, it is possible that the missing source code files do not contain any symbols of interest or use or modify a date field within the missing code files and the process can proceed to the analysis 80.

Figure 4:
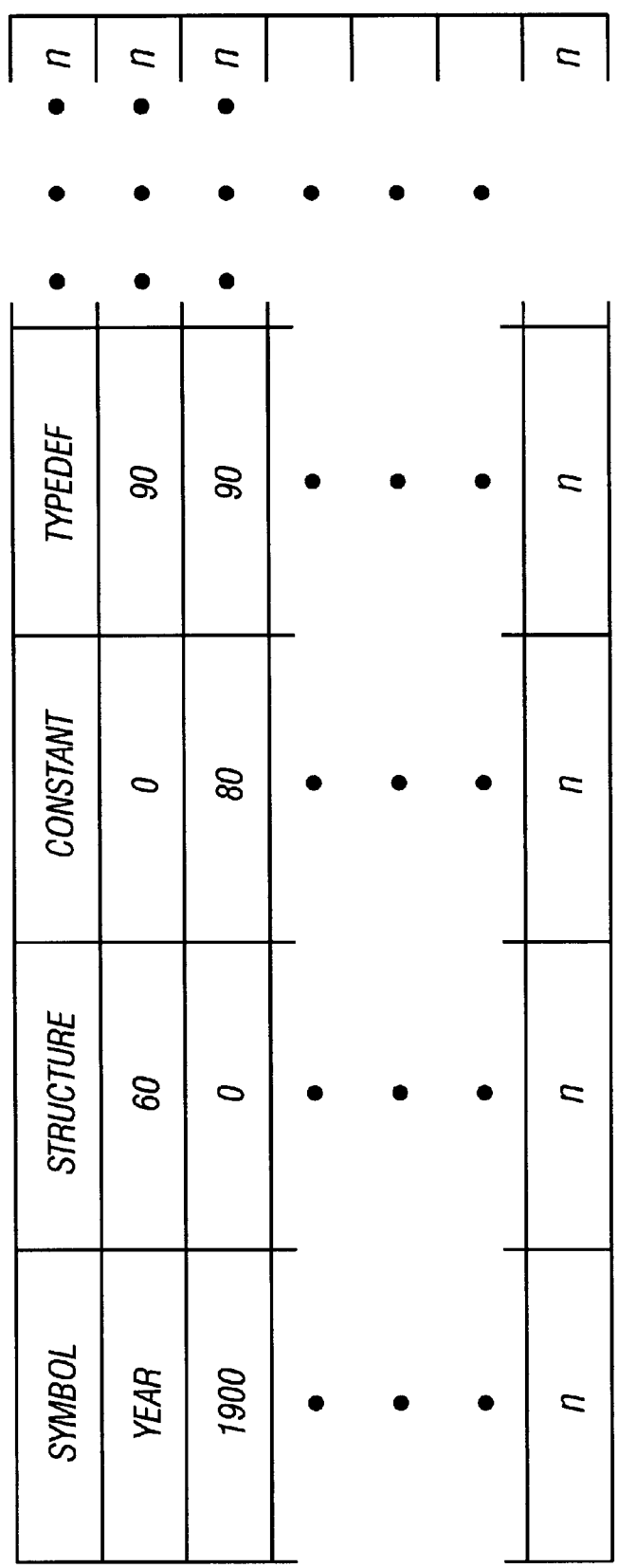
FIG. 4 is an exemplary table of the properties associated with the seed list.

The table of FIG. 4 is an example of the seed list construction that contains character sequences that are likely to be encountered and is modifiable at the user level by adding more symbols. With each symbol in the seed list there is an associated attribute, such as structure, constant, typedef and so on, and confidence factor. The attribute field describes how the symbol may be used within the computer program code. The attribute definitions are a complete list of all possible cases. The confidence level is initially statically assigned based on the attribute. This allows the symbol to be significant or insignificant based on the way that it used within the context of the computer program code. This limits number of actual matches for a given symbol to the number of matches that are actually significant. In practice, this list is carefully checked and symbols may be added or confidence factors adjusted prior to constructing the symbol table.

The table of FIG. 5 is an example of the symbol table as a product of applying the seed list to the total list of all symbols to obtain the confidence factor associated with the attributes for each symbol. The symbols are extracted from the source code and are organized according to their attributes, confidence, source code location, and distance. An entry into the table is made for each usage or attribute so that the same symbol could occur multiple times with the database. The confidence and distance are dynamically modified in the course of the normal execution of the present invention.

The table of FIG. 5a is an example of the parse database as constructed on a per symbol basis. Each symbol is decomposed into its various constructs in the analysis and stored for use in the remediation to determine the optimum remediation point. This table is generated using standard parsing techniques and is well understood in the art of compiler theory relating to sibling order. Simply, the order of the symbols indicates how it is used. By example, if the expression was x=y, then the x would be listed first and followed by y. This is important information that is used during the processing of FIG. 7. Equally important are the parent and the location of the file, line and column of the symbol so that the symbol database can be constructed.

Figure 6:
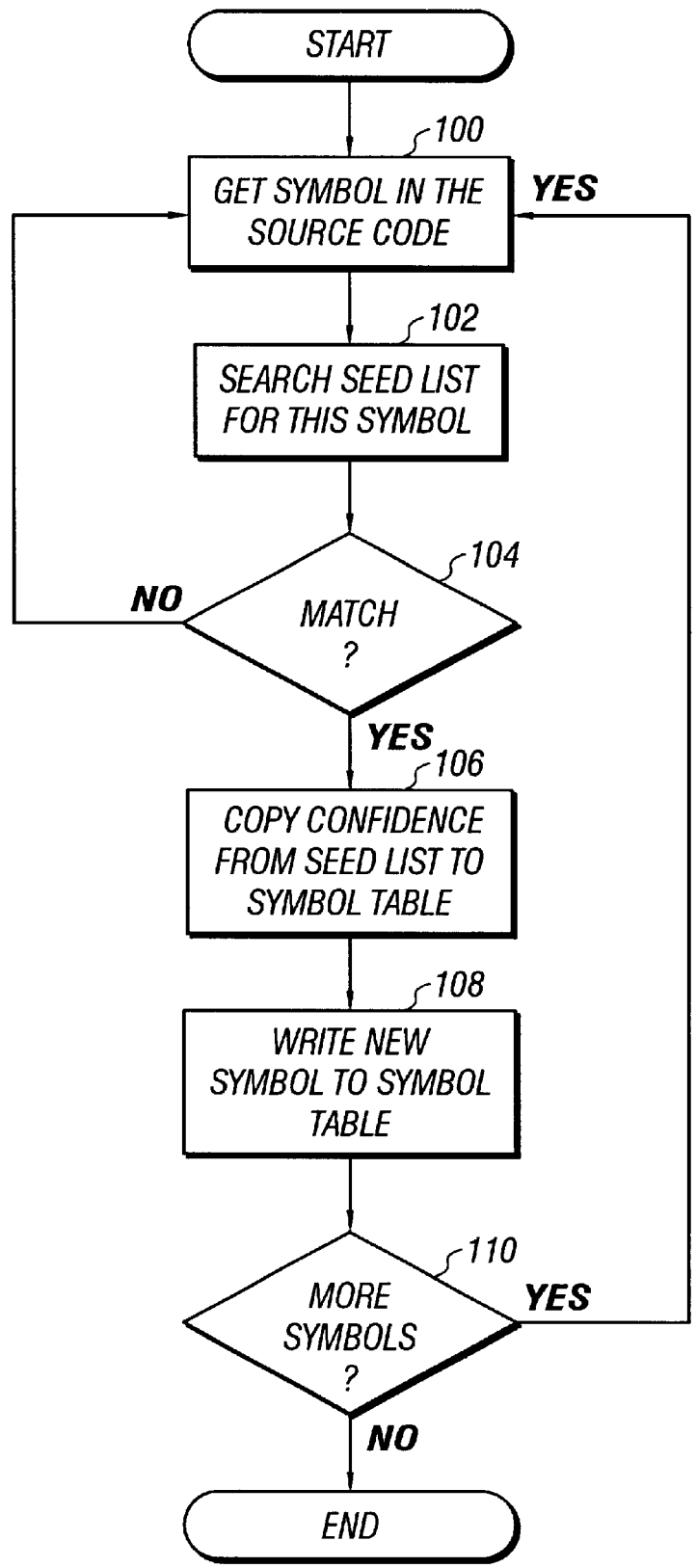
FIGS. 6, 7, and 7a are flowcharts of the iterative steps of the analysis component.

Referring now to FIG. 6, the flow chart illustrates how the symbol database is constructed. Processing occurs at the source code file level one after another until all have been processed as in the following description. In step 100, a symbol is obtained from the source code and in step 102 a search is made for this symbol in the seed list as shown in FIG. 4. Responsive to not obtaining a match in the seed list control is transferred back to step 100, which is to say that non-matching symbols are ignored. Responsive to obtaining a match in step 104, the confidence is copied from the seed list to the symbol database in step 106. In step 108 the new symbol, the associated confidence and location by way of file name, line number and row are written to the symbol database as also described in FIG. 2a at step 44. In step 110, a query is performed to determine if there are any remaining symbols and if there are more symbols remaining, then the process repeats by going back to step 100. When all symbols have been processed, the symbol, confidence and location fields as described in FIG. 5 will be fully populated.

Figure 7:
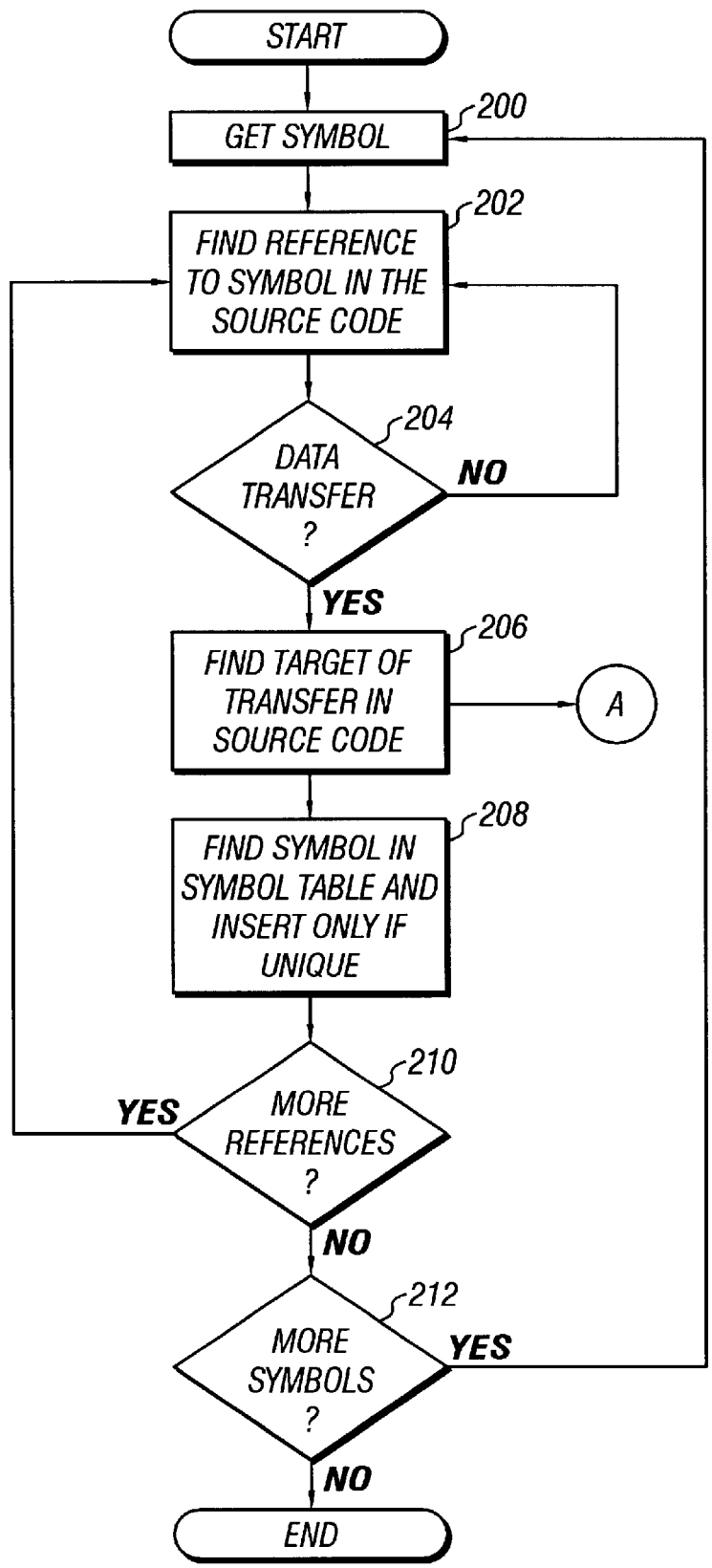

Referring now to FIG. 7, the flow chart illustrates how the method of propagation is performed. Referring back to FIG. 5, propagation is the method in which the symbol database is further populated and dynamically modified during the normal course of remediation. In step 200, a symbol is obtained from symbol database. This symbol is located in the current source code file in step 202. Propagation follows redefinition as in the case of a=b, b=c, c=d and so on. Here we are only interested in redefinition so the query in step 204 is to determine if the symbol in the source code file is used as a data transfer. Data transfers are all types of redefinition including those passed by a function as follows:

X TodaysDate;
ProcessCurrentDate (A,B,X);

Now the actual function ProcessCurrentDate is defined:

ProcessCurrentDate (Employee, Rank, MiscInfo);

This is recognized as a data transfer from X to MiscInfo by virtue of the receiving functions third parameter with information from the parse data and source code. Thus, reducing all forms of redefinition to a form of data transfer prevents a symbol from escaping detection during the course of redefinition. This is referred to as swap-by-propagation. Referring back to the result of the said comparison at step 204 having a negative result, the next symbol is loaded in step 202. When the result of the comparison at step 204 is positive, the target of the transfer is obtained in step 206. If the new target symbol is not already located in the symbol data base at step 208, a new entry is made in the symbol database containing the said target symbol. Processing continues in FIG. 7a at this point and this will be addressed at the completion of the description of FIG. 7. At step 210 a query is made for additional references which means additional references to the current symbol. A negative result in step 210 returns to step 202 to repeat the process by obtaining the next symbol in the symbol database. A positive result in the query of step 210 results in another query at step 212 to determine if there are any more symbols remaining in the symbols database. A positive result to the query of step 212 results in repeating the process by returning to step 200. A negative result to the query at step 212 terminates the process. At the conclusion of the process described in FIG. 7 a return is made to repeat the entire process by returning the process described by FIG. 6.

Figure 7A:
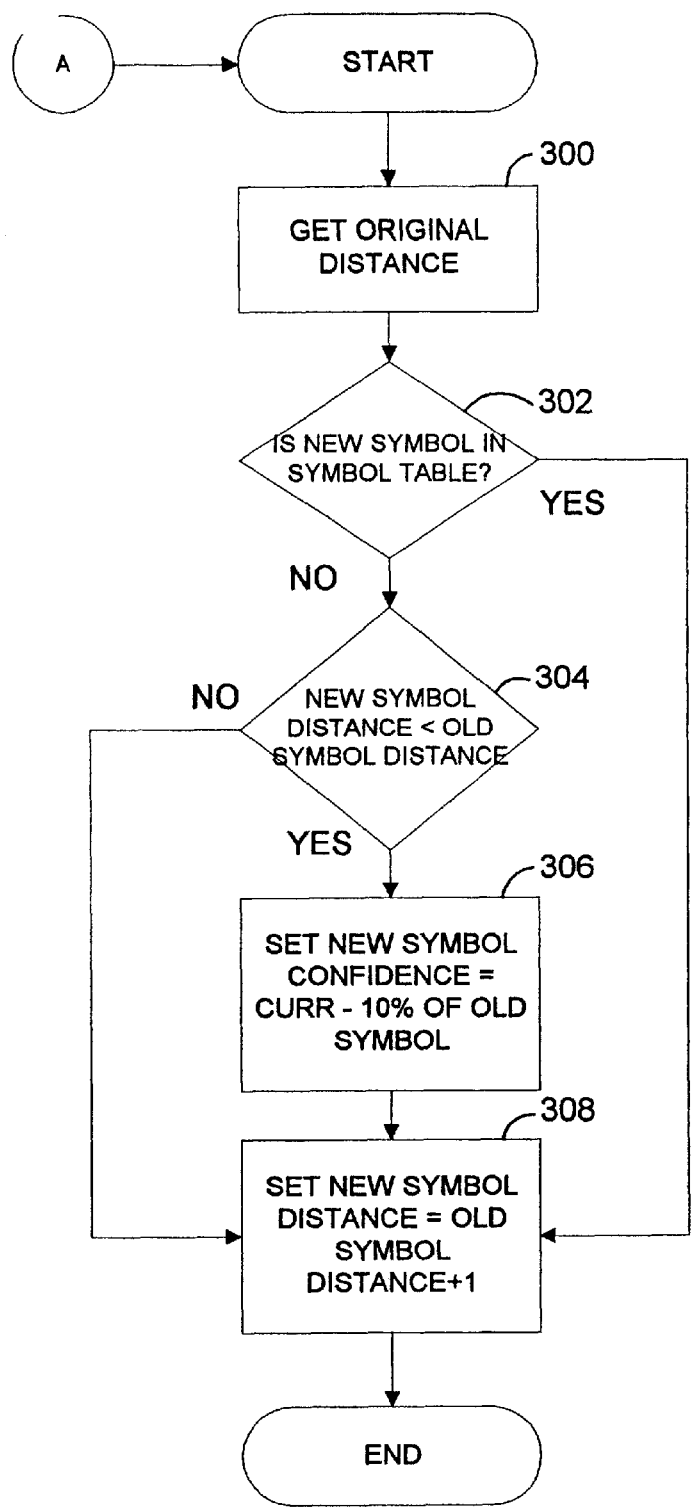

Referring now to FIG. 7a, the flow chart illustrates how the confidence and distance is calculated which populates confidence and distance fields of the symbol data base as described by FIG. 5. In step 300, the original distance is obtained. The first time that this field is accessed the field will always be zero. In step 302, a query is made to determine if this is a new symbol. Responsive to the result of the query at step 302 being positive, the new symbol inherits the distance of the original symbol and adds one. Thus, it can be seen that the number of redefinition and the distance are the same. When the results of the query at step 302 are negative, a new query is made at step 304 to determine if the distance of the new symbol is less that the distance of the old symbol. Responsive to the results of the query at step 304 being negative, the new symbol's distance is calculated to be the old symbol's distance plus one. If the results of the query at step 304 are positive, the confidence of the new symbol is calculated by reducing the amount of the confidence by 10%. Note that any confidence greater than zero to start with will never actually get to zero no matter how many times that a positive value is reduced by 10%. The value of 10% is flexible and any value between 1% and 99% can be used. Processing continues now to step 308 where the new symbol's distance is set to the old symbols distance plus one. Finally, processing at this point returns to FIG. 7 at step 210.

Referring now to FIG. 8, the table represents a linked list of the constructs used in the determination of the priority order of remediation. The table represents the order that is used on standard C and C++ programs in the preferred embodiment of the present invention. This order is based on how rigid the definition is within the confines of the computer language. In this example, a structure is the most rigid because the definition does not change within the scope of the program. Variables are lower in the priority order because it is natural for them to be redefined within the scope of the program and so on. Other computer languages have similar constructs and all computer languages can be similarly decomposed. This priority order is used in step 400 of FIG. 9 as follows: all structures are processed one after another until no more structure are remaining; all constants are processed one after another until no more constants are remaining; and so on for all of the entries in FIG. 8. This table data is constructed to minimize remediation efforts by presenting the optimal remediation points for each symbol.

Figure 9:
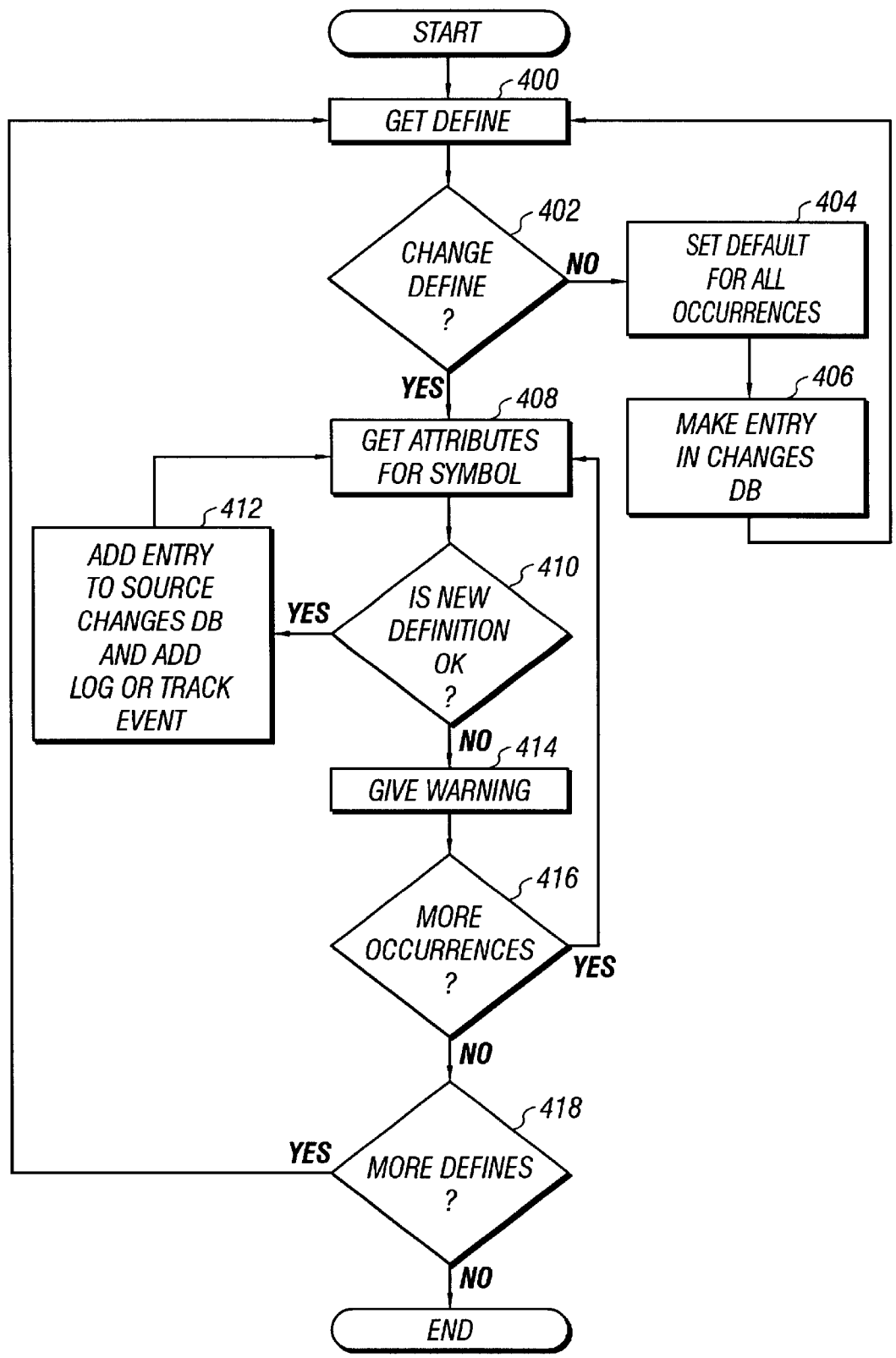
FIG. 9 is a flow chart of the method used to generate the code changes database.

Referring now to FIG. 9, the flow chart illustrates how the code changes data base is populated during the remediation. In step 400, a define is obtained based on the data in FIG. 8 and a query at step 402 is made to determine if the user wants to change the definition of the symbol. Responsive to a negative result from the query at step 402 the current definition of symbol becomes default definition and is applied to all occurrences of the symbol in step 404. In step 406, any changes to the original source code required to insure that all occurrences of the symbol's definition are identical are entered into the code changes data base with a corresponding unique logging or event number and optional testing method description, then a return is made to step 400. Responsive to a positive result to the query at step 402, the various attributes of the symbol throughout the source code are obtained in step 408. A query is conducted at step 410 to determine if the new definition of the symbol is compatible with the manor in which it is being used in step 410. Responsive to a positive result to the query at step 410, the symbols new definition is spooled to the code changes data base with the corresponding file name, line number and column information and a unique logging or event number and optional testing method description. Now the method is automatically performing a transformation of the symbol as opposed to a manual remediation at step 412. This is followed by a return to step 408. Responsive to a negative result from the query at step 410, a warning message is generated. This should be a rare case in which a method other than redefinition is intended for resolving this particular symbol's definition. This may be the case when a larger fragment of the code is reworked due to the field length of a printout or display or the size of the item being output to data base when the original symbol size can not be altered. In step 416 a query is made internally to determine if there are any more occurrences of the symbol for additional attributes. Responsive to a positive result to the query at step 416, a return is made to step 408 for the next use of the symbol. Responsive to a negative result from the query at step 416, a query is made at step 418 to check for any remaining definitions. Responsive to a positive result to the query at step 418, a return is made to step 400 to get the next define. A negative result at step 418 means that all symbol definitions have been processed and that the remediated code can be rebuilt and tested. The actual code changes are in the form of an insert and delete at a specific line number for a specific file name.

Figure 10:
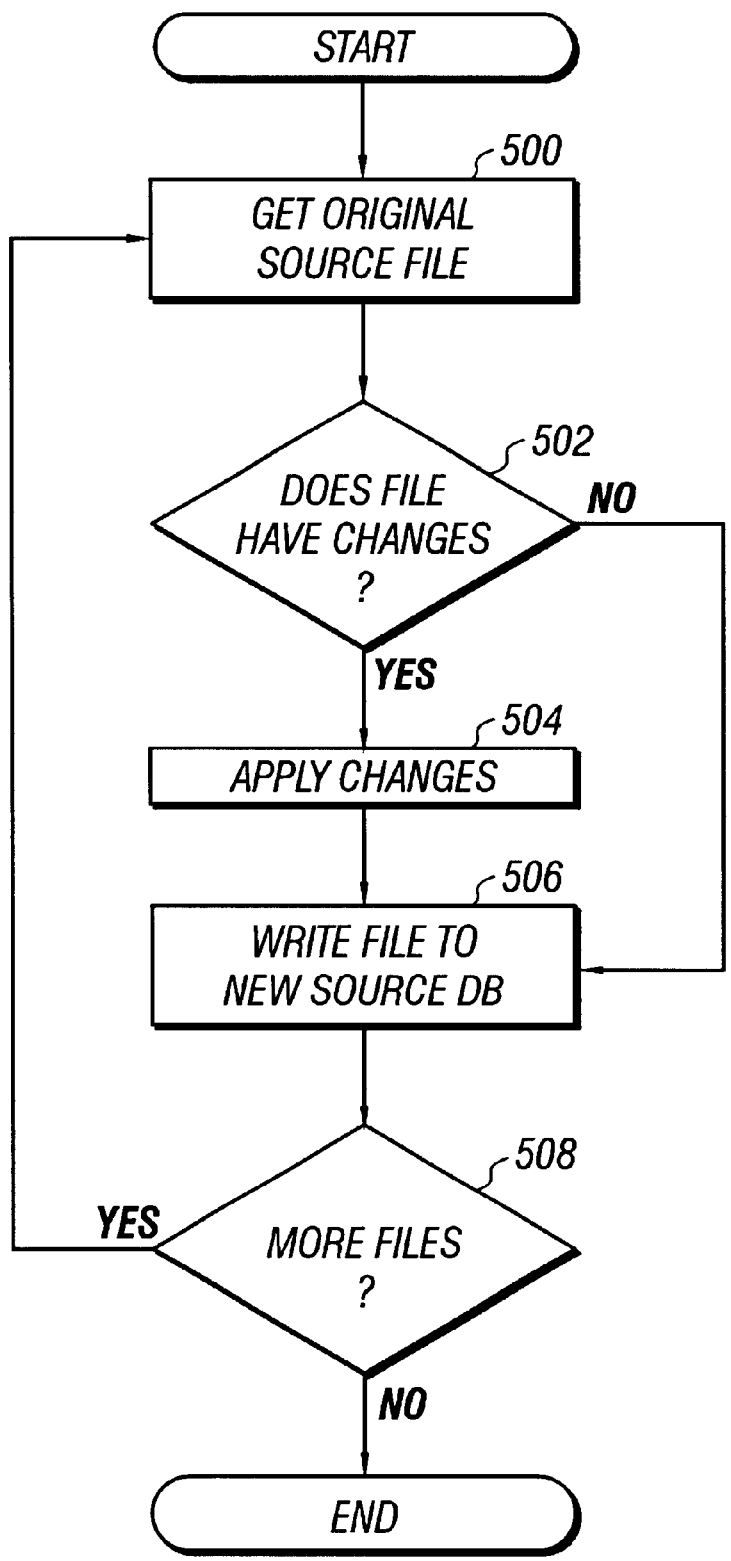
FIG. 10 is a flow chart of the method used to generate the new source code.

Referring now to FIG. 10, the flow chart illustrates the method used to generate the new source database. This is a combination of the original source code and the source code changes in the code changes database. In step 500, a single source code file is obtained. In step 502, a check is made to determine if this particular source code file has any changes associated with it in the code changes database. Responsive to negative result for the query in step 502, the file is copied to the new source database in step 506. Responsive to a positive result from the query at step 502, the source code changes are applied one after another until the end of file is reached at step 504 and the new file is then written to the new source data base in step 506. In step 508, a query is made to determine if there are any source files remaining and if so, a return is made to step 500 to process the next file.

Finally, the new source code containing the remediations and logging or tracking events is used to build or regenerate the executables and begin the iterative process of entering dates that begin at the year 2000 and beyond. After all dates have been entered, the logging or tracking events are compared against the total on record. Although some of the events may occur multiple times, the test is to determine if each of the inserted logging or tracking events have occurred at least once. In the event that one or more of the previously recorded logging or event tracking statements failed to be reported after all of the testing was done, the file name and line number can be accessed. A description field of how to test the modified code may contain the testing method, if it was entered during the remediation. When all of the said events have occurred at least once and the results are satisfactory, testing and verification are completed.

The foregoing disclosure and the content of the drawings are merely illustrative of the principals of this invention and are not to be interpreted in a limiting sense.

What we claim is:

1. An optimized computer implemented method for the inventory, identification, remediation, and documentation of computer code fragments in source code form wherein said computer code fragments do not have a clearly definable search criteria comprising the steps of:

(a) identifying said computer code fragments;

(b) analyzing said computer code fragments;

(c) remediating said computer code fragments; and (d) documenting said computer code fragments; wherein the step of documenting said computer code fragments further comprises the steps of:

building or regenerating the new executable using the remediated code base; and (f) inserting unique logging statements generated to document the remediation changes.

2. An optimized computer implemented method for the inventory, identification, remediation, and documentation of computer code fragments in source code form wherein said computer code fragments do not have a clearly definable search criteria comprising the steps of:

(a) identifying said computer code fragments;

(b) analyzing said computer code fragments;

(c) remediating said computer code fragments; and (d) documenting said computer code fragments;

wherein the step (a) of identifying said computer code fragments comprises:

(e) constructing a seed list;

(f) generating a parse tree table of the code fragment source code; and (g) generating a global cross-referencing symbol table of the code fragment source code; and wherein said step of constructing a seed list further comprises the steps of:

(h) selecting character sequences likely to be of interest and constructing a seed list; and (i) assigning a confidence factor associated with the various attributes of said character sequences within a computer program for each seed list.

3. An optimized computer implemented method for the inventory, identification, remediation, and documentation of computer code fragments in source code form wherein said computer code fragments do not have a clearly definable search criteria comprising the steps of:

(a) identifying said computer code fragments;

(b) analyzing said computer code fragments;

(c) remediating said computer code fragments; and (d) documenting said computer code fragments;

wherein the step (a) of identifying said computer code fragments comprises:

(e) constructing a seed list;

(f) generating a parse tree table of the code fragment source code; and (g) generating a global cross-referencing symbol table of the source code;

wherein said step of generating a global cross referencing symbol table of the source code to populate the distance and confidence factors further comprises:

(h) initializing the distance value in the symbol table to zero for all symbols;

(i) repeating the following steps (1), (2), (3), and (4) for a plurality of symbols until all symbols have been processed:

(1) obtaining a symbol in the source code;

(2) searching the seed list for a match to said symbol;

(3) responsive to finding a matching symbol in step (2), copying the confidence factor from the seed list entry to the symbol table entry; and (4) responsive to finding a matching symbol in step (2), storing said matching symbol table entry into the global symbol table.

4. An optimized computer implemented method for the inventory, identification, remediation, and documentation of computer code fragments in source code form wherein said computer code fragments do not have a clearly definable search criteria comprising the steps of:

(a) identifying said computer code fragments;

(b) analyzing said computer code fragments;

(c) remediating said computer code fragments; and (d) documenting said computer code fragments;

wherein the step (b) of analyzing said computer code fragments further comprises repeating the following steps (1), (2), (3), and (4) for a plurality of symbols until all symbols have been processed:

(1) extracting a symbol from a symbol table;

(2) locating said symbol in the code fragment source code;

(3) determining if said symbol was used in a data transfer; and (4) responsive to a positive determination in step (3) that said symbol was used in a data transfer, processing the new symbol table entry;

wherein said step of processing the new symbol table entry further comprises:

(e) locating the target of the transfer in the code fragment source code;

(f) inserting the new symbol into the symbol table entry if the symbol is not already present in the symbol table; and (g) adjusting confidence and distance factors in the symbol table entry.

5. The method of claim 4, wherein said step (g) of adjusting the confidence and distance factors in the symbol table entry further comprises the steps of:

(h) accessing an original distance factor for the symbol in the symbol table entry;

(i) checking for occurrences of the new symbol in the symbol table;

(j) responsive to finding the new symbol already in the symbol table, setting the distance of the new symbol equal to the distance factor of the original symbol distance factor plus one; and (k) responsive to not finding the new symbol in the symbol table, comparing the new symbol's distance factor to the original symbol's distance factor and if less than the old symbol's value, calculating the new symbol's confidence factor.

6. The method of claim 5, wherein the step of calculating the new symbol's confidence factor further comprises:

(l) obtaining the confidence factor of the original symbol; and (m) setting the confidence factor of the new symbol equal to the confidence factor of the original symbol minus a predetermined percentage of the original symbol's confidence factor.

7. An optimized computer implemented method for the inventory, identification, remediation, and documentation of computer code fragments in source code form wherein said computer code fragments do not have a clearly definable search criteria comprising the steps of:

(a) identifying said computer code fragments;

(b) analyzing said computer code fragments;

(c) remediating said computer code fragments; and (d) documenting said computer code fragments;

wherein the step of remediating said computer code fragments further comprises:

(e) determining the optimal remediation priority for the various computer program constructs in table form; and (f) applying remdiations iteratively until all have been processed;

and wherein said step of applying remediations iteratively until all have been processed further comprises obtaining the top most rigid definition of the remediation priority order and repeating the following steps (1), (2), and (3) for a plurality of definitions:

(1) querying for a change in said definition;

(2) responsive to a negative result in said query, setting the current definition to be the default definition for all occurrences of the definition; and (3) responsive to a positive result in said query, processing the new definition.

8. The method of claim 7, wherein said step (3) of processing the new definition further comprises:

(g) obtaining an attribute of a symbol in a code fragment and performing the following steps for said attribute:
  (i) determining if the new definition is compatible with the attribute;
  (iii) responsive to a positive result from said determination in step (i), processing source code changes of the new definition; and
  (iv) responsive to a negative result from said determination in step (i), providing a warning.

9. The method of claim 8, wherein said step (ii) of processing the source code changes of the new definition further comprises:
  (h) composing one or more sets of insert and delete commands pertaining to the new definition;
  (i) inserting said commands into a storage area;
  (j) inserting a unique logging number into said storage area; and
  (k) optionally inserting a comment describing the remediation method.

10. A computer program product for use in a computer system, said computer program product comprising:
  a computer usable medium having computer readable program code means embodied in said medium for the identification, remediation, and verification of computer program code fragments in source code form, said computer code fragments not having a clearly defined search criteria, said computer program product having:
    (a) computer readable program means for identifying said computer code fragments;
    (b) computer readable program means for analyzing said computer code fragments;
    (c) computer readable program means for remediating said computer code fragments comprising a remediated code base; and
    (d) computer readable program means for documenting said computer code fragments;
  wherein the computer program product means of verifying said computer code fragments further comprises:
    (e) computer program product means for building or regenerating a new executable program using said remediated code base.

11. The computer program product means of claim 10, wherein said computer program product means for applying remediations one after another until all have been processed further comprises:
  (f) computer program product means for obtaining a top most rigid definition of the remediation priority order;
  (g) computer program product means for querying for a change in said definition;
  (h) computer program product means responsive to a negative result in said query to set the current definition to be the default definition for all occurrences of the definition; and
  (i) computer program product means responsive to a positive result in said query to process the new definition.

12. The computer program product means of claim 11, wherein said computer program product means for processing the new definition further comprises
  (j) computer program product means for obtaining the attribute of a symbol from the symbol table;
  (k) computer program product means for determining if said new definition is compatible with the current attribute;
  (l) computer program product means responsive to a positive result from said determination in step (k) to process source code changes of the new definition; and
  (m) computer program product means responsive to a negative result from said determination in step (k) to provide a warning.

13. The computer program product means of claim 11, wherein said computer program product means for processing the source code changes of the new definition further comprises:
  (j) computer program product means for composing one or more sets of insert and delete commands pertaining to the old and new defintion;
  (k) computer program product means for inserting said commands into a storage area;
  (l) computer program product means for inserting a unique logging number into said storage area; and
  (m) computer program product means for optionally inserting a comment to document the remediation change.

14. A computer program product for use in a computer system, said computer program product comprising:
  a computer usable medium having computer readable program code means embodied in said medium for the identification, remediation, and verification of computer program code fragments in source code form, said computer code fragments not having a clearly defined search criteria, said computer program product having:
    (a) computer readable program means for identifying said computer code fragments;
    (b) computer readable program means for analyzing said computer code fragments;
    (c) computer readable program means for remediating said computer code fragments comprising a remediated code base; and
    (d) computer readable program means for documenting said computer code fragments;
  wherein the computer program product means of identifying said computer code fragments comprises:
    (e) computer program product means for constructing a seed list;
    (f) computer program product means for generating a parse tree table of said computer program code fragments; and
    (g) computer program product means for generating a global cross-referencing symbol table of said computer program code fragments;
  and wherein said computer program product means for constructing a seed list further comprises:
    (h) computer program product means for selecting character sequences likely to be of interest and constructing a seed list; and
    (i) computer program product means for assigning a confidence factor and a distance factor to be associated with the various attributes of said character sequences within a computer program for each seed list entry.

15. The method of claim 14, wherein said computer program product means for generating a global cross referencing symbol table of said computer program code fragments to derive said distance and confidence factors further comprises:
  (j) computer program product means for initializing said distance factor to zero for all entries in said symbol table;

(k) computer program product means for obtaining a new symbol in said computer program code fragments;

(l) computer program product means for searching said seed list for a match to said new symbol;

(m) computer program product means for copying to the symbol table said confidence factor from the seed list entry for any match found in step (l) table; and (n) computer program product means for storing a new symbol table entry for said any match in said global symbol table.

16. The computer program product means of claim 15, wherein said computer program product means for generating a global cross referencing symbol table further comprises:

(o) computer program product means for locating a target of a transfer in a computer program source code fragment;

(p) computer program product means for inserting an entry for said new symbol into the symbol table if the an entry for new symbol is not already present in the symbol table; and (q) computer program product means for adjusting the confidence and distance factors in the symbol table entry for said new symbol.

17. The computer program product means of claim 16, wherein said computer program product means for adjusting the confidence and distance factors in the symbol table entry for said new symbol further comprises:

(r) computer program product means for accessing an original distance factor for said new symbol in said symbol table entry for said new symbol;

(s) computer program product means for checking for occurrences of existing entries for the new symbol in the symbol table;

(t) computer program product means responsive to finding an existing entry for the new symbol already in the symbol table to set the distance factor of the new symbol equal to the distance factor of the original symbol entry plus one; and (u) computer program product means responsive to not finding an existing entry for the new symbol in the symbol table to compare the new symbol's distance factor to the original distance factor and if less than the original symbol's distance factor, calculating the new symbol's confidence.

18. The computer program product means of claim 17, wherein said computer program product means for calculating the new symbol's confidence further comprises:

(v) computer program product means for obtaining the confidence factor of the original symbol; and (w) computer program product means for setting the confidence factor of the new symbol to the confidence factor of the original symbol minus a predetermined percentage of the original symbol's confidence factor.

* * * * *